United States Patent [19]

Blake et al.

[11] Patent Number: 5,198,983
[45] Date of Patent: Mar. 30, 1993

[54] METHOD AND APPARATUS FOR SEMI-AUTOMATED INSERTION OF CONDUCTORS INTO HARNESS CONNECTORS

[75] Inventors: Evan E. Blake; Paul F. Newman, both of Bedford; Dale W. Springer, Hurst, all of Tex.

[73] Assignee: Bell Helicopter Textron Inc., Fort Worth, Tex.

[21] Appl. No.: 601,816

[22] PCT Filed: Jul. 9, 1990

[86] PCT No.: PCT/US90/03744

§ 371 Date: Jul. 9, 1990

§ 102(e) Date: Jul. 9, 1990

[51] Int. Cl.$^5$ .......................... G06F 15/46; B23P 19/04
[52] U.S. Cl. ........................................ 364/468; 29/721; 29/739; 29/747
[58] Field of Search .................... 364/468, 488, 167.01, 364/472; 29/33 M, 703, 720, 721, 739, 747, 748, 833, 857

[56] References Cited

U.S. PATENT DOCUMENTS

| | | | |
|---|---|---|---|
| 4,190,890 | 2/1980 | Marx | 364/491 |
| 4,271,573 | 6/1981 | von Roesgem | 29/33 M |
| 4,566,164 | 1/1986 | Brown et al. | 29/33 M |
| 4,576,662 | 3/1986 | Lemke | 156/52 |
| 4,638,558 | 1/1987 | Eaton | 29/861 |
| 4,641,427 | 2/1987 | Shields | 29/857 |
| 4,653,159 | 3/1987 | Henderson et al. | 29/33 M |
| 4,653,160 | 3/1987 | Thorkildsen et al. | 29/33 M |
| 4,654,964 | 4/1987 | Schneider et al. | 29/705 |
| 4,677,734 | 7/1987 | Bloch et al. | 29/564.2 |
| 4,715,099 | 12/1987 | Yoshida | 29/33 M |
| 4,715,100 | 12/1987 | Cross | 29/33 M |
| 4,727,637 | 3/1988 | Buckwitz et al. | 29/407 |
| 4,803,778 | 2/1989 | Cross | 29/857 |
| 4,890,382 | 1/1990 | Anderson et al. | 29/833 |

*Primary Examiner*—Jerry Smith
*Assistant Examiner*—Paul Gordon
*Attorney, Agent, or Firm*—Richards, Medlock & Andrews

[57] ABSTRACT

A method and apparatus for semi-automating the termination of randomly selected conductors (50) of a harness (48) into the correct cavities (44) of a connector (46) is disclosed and includes a fixture (34) to hold the connector (46), a light device (30) for positioning a spot of light (42) on a designated cavity (44) which is to receive either a moisture plug (87) or a randomly selected conductor (50) for termination, a computer (26) to provide control signals to move the spot to the correct cavity (44) and a voice data-link (28) connected to the computer (26) to verbally transfer information, including direction and confirmation, between the computer (26) and the operator.

53 Claims, 4 Drawing Sheets

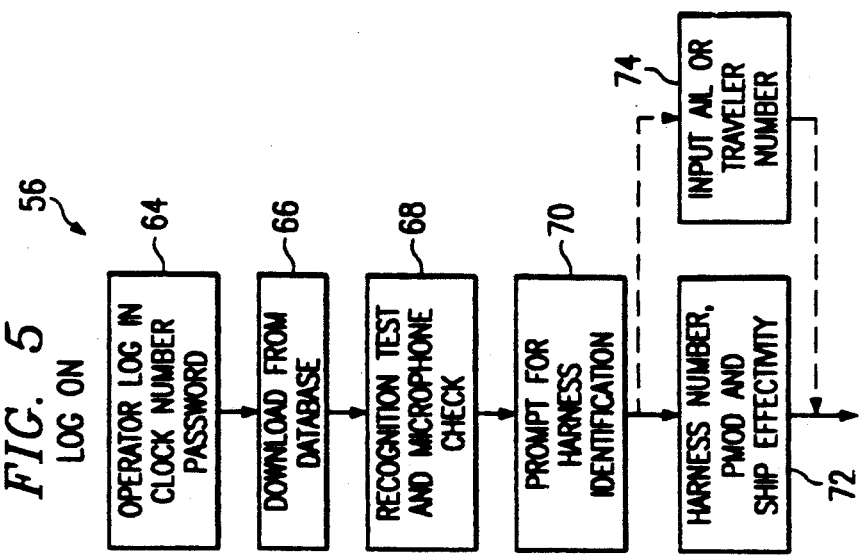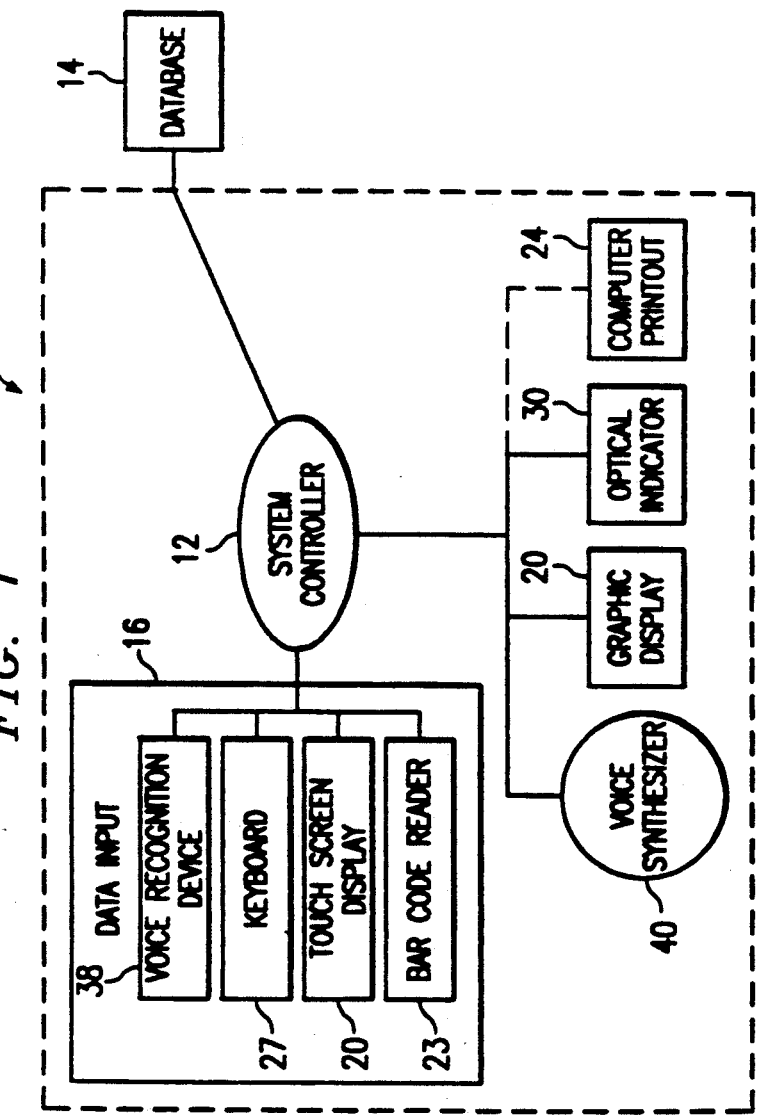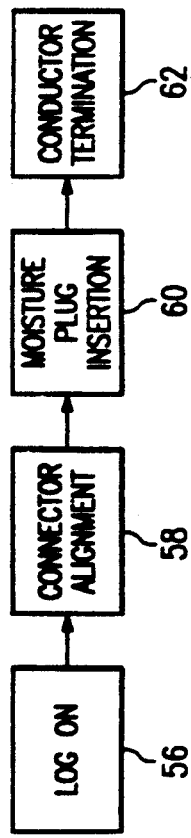

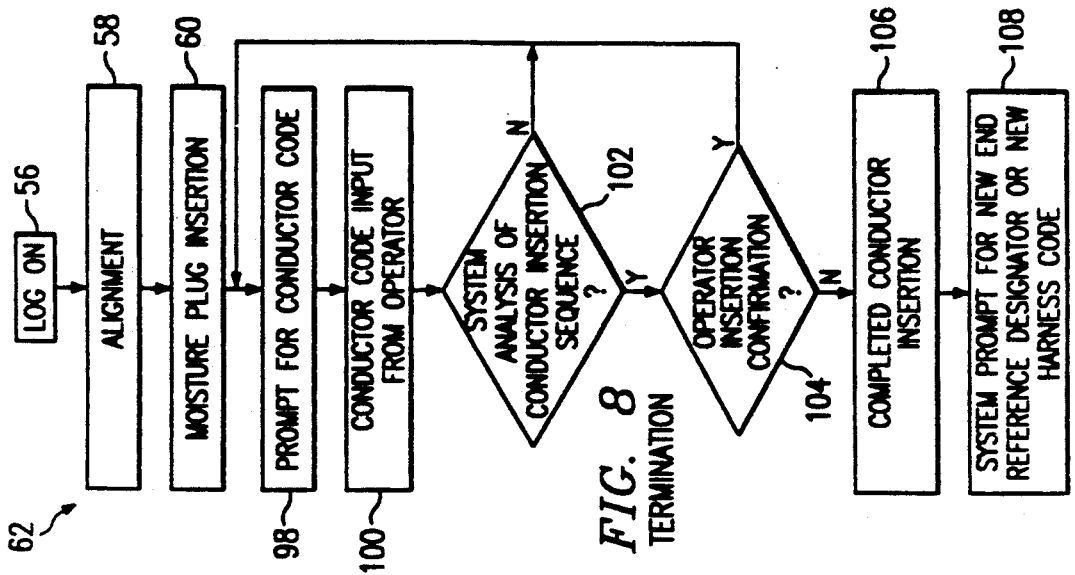
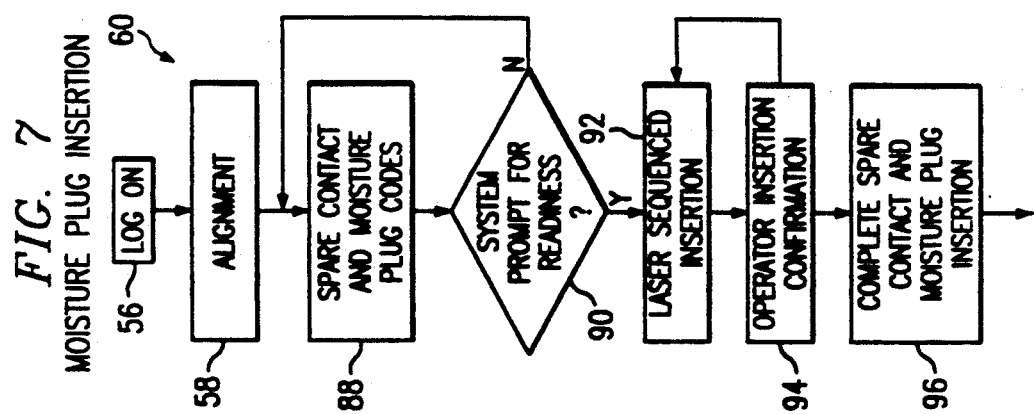
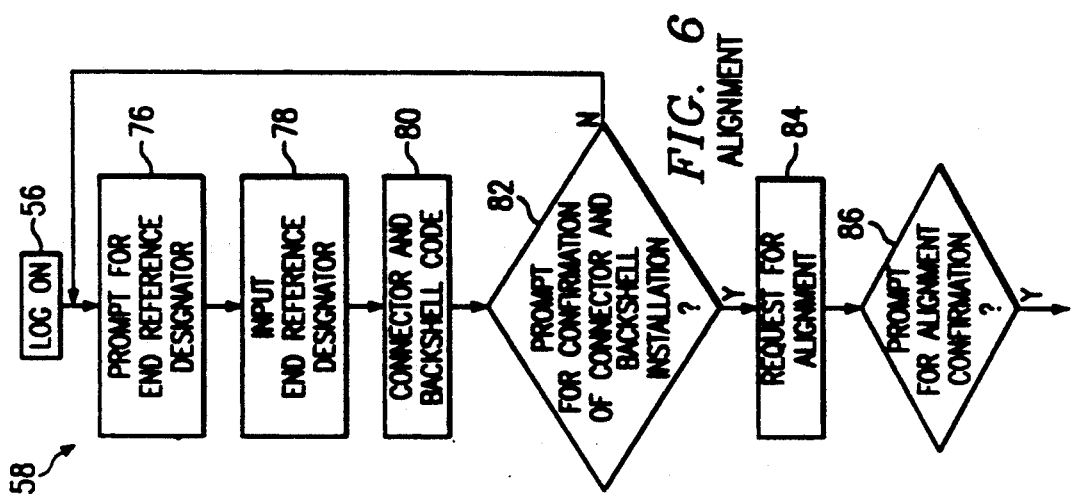

METHOD AND APPARATUS FOR SEMI-AUTOMATED INSERTION OF CONDUCTORS INTO HARNESS CONNECTORS

TECHNICAL FIELD OF THE INVENTION

This invention relates generally to harness fabrication. More particularly, but not by way of limitation, this invention relates to a method and apparatus for semi-automating the termination of randomly selected harness conductors into a connector.

Although this invention is applicable for randomly installing various predetermined components into designated locations in an assembly unit, it has been found to be particularly useful in the environment of the termination of conductors in a harness into designated cavities in a connector. Therefore, without limiting the applicability of the invention to "the termination of conductors in a connector", the invention will be described in such environment. Although the invention may be practiced using various types of input and output devices, the invention will be described with a voice recognition device in the input and a voice synthesizer device in the output.

A harness is an assembly of multiple conductors which have been cut to appropriate lengths, laid out in a predetermined pattern, terminations provided on the ends of the conductors and the ends of the conductors terminated into predetermined cavities in connectors. The harness is bundled to provide a pre-assembled package of conductors for incorporation into a device such as a computer, aircraft, etc.

A harness which is fabricated manually results in the cost of fabrication being relatively high because the fabrication process is very labor intensive. The present process of termination of the harness conductors in a connector comprises an operator who first selects a bundle of conductors to be terminated The operator then finds the corresponding work aid, which is a sheet of paper that relates the conductors to a specific connector, and acquires the appropriate connector and associated hardware for termination. The operator then inserts moisture plugs in accordance with the work aid in all unused cavities. The operator then reads the identification number of a conductor and turns to the work aid to find that conductor's specific cavity in the connector. Upon correlation of the conductor and the connector cavity from the work aid, the operator picks up the connector and finds the cavity Before insertion of the conductor, the operator once again consults the work aid to verify the proper location of the cavity and the proper relation between the conductor and the cavity. This process is repeated until all cavities in a connector are filled This manual termination is labor intensive, fatiguing to the operator and allows many opportunities for error.

The present invention provides a computer-aided process of terminating randomly selected harness conductors into a connector to increase operator productivity and improve the quality of the harness This is accomplished by providing the operator with computer-aided identification, location and termination of conductors in a connector.

It will be appreciated that the present invention may also be used to install or assemble randomly selected predetermined components into predetermined locations in an assembly unit.

SUMMARY OF THE INVENTION

This invention provides a method and apparatus for semi-automating the termination of randomly selected conductors of a harness into the correct cavity of the correct connector. The apparatus comprises a fixture to hold the connector, a light device for positioning a spot of light on a particular cavity which is to receive a moisture plug or a designated conductor for termination, a computer to provide control signals to move the spot of light from cavity to cavity and data input means including a bar code reader, a keyboard, a touch screen display and/or a voice data-link system connected to the computer to transfer information, including directions and confirmation, between the apparatus and an operator The computer has the capability to access an external data base which contains all the harness and connector information pertaining to the particular harnesses being terminated.

The method of semi-automating the termination of randomly selected conductors of a harness into the correct cavity in a connector prompts an operator to verbally input harness identification information into a computer via a voice recognition device or manually via a keyboard, a bar code reader or a touch screen display. The computer searches a harness data base to access information to determine which cavities are to have moisture plugs inserted therein and which cavities are to have the randomly selected conductors inserted therein. The computer controls a light indicator device which illuminates a cavity into which the operator inserts a moisture plug and confirms such insertion to the computer via a voice recognition device. The light indicator device then illuminates another cavity and the process is repeated until all the cavities requiring moisture plugs have received them. The computer prompts the operator, via the voice synthesizer device for a conductor identification code. The operator verbally inputs a conductor identification code for a randomly selected conductor, via the voice recognition device, to the computer which commands the light indicating device to illuminate a designated cavity The operator terminates the randomly selected conductor into the illuminated cavity then the computer prompts the operator for another conductor identification code and the process is repeated until all the conductors have been inserted in the connector.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which:

FIG. 1 is a simplified block diagram of a semi-automated system for the termination of harness conductors according to the present invention;

FIG. 4 is a flow diagram showing the four primary phases of the method according to the present invention;

FIG. 5 is a flow diagram showing the log-on phase of the present inventive method;

FIG. 6 is a flow diagram showing the alignment phase of the present inventive method;

FIG. 7 is a flow diagram showing the moisture plug insertion phase of the present inventive method; and FIG. 8 is a flow diagram showing the termination phase of the present inventive method.

DETAILED DESCRIPTION

Figure 2:
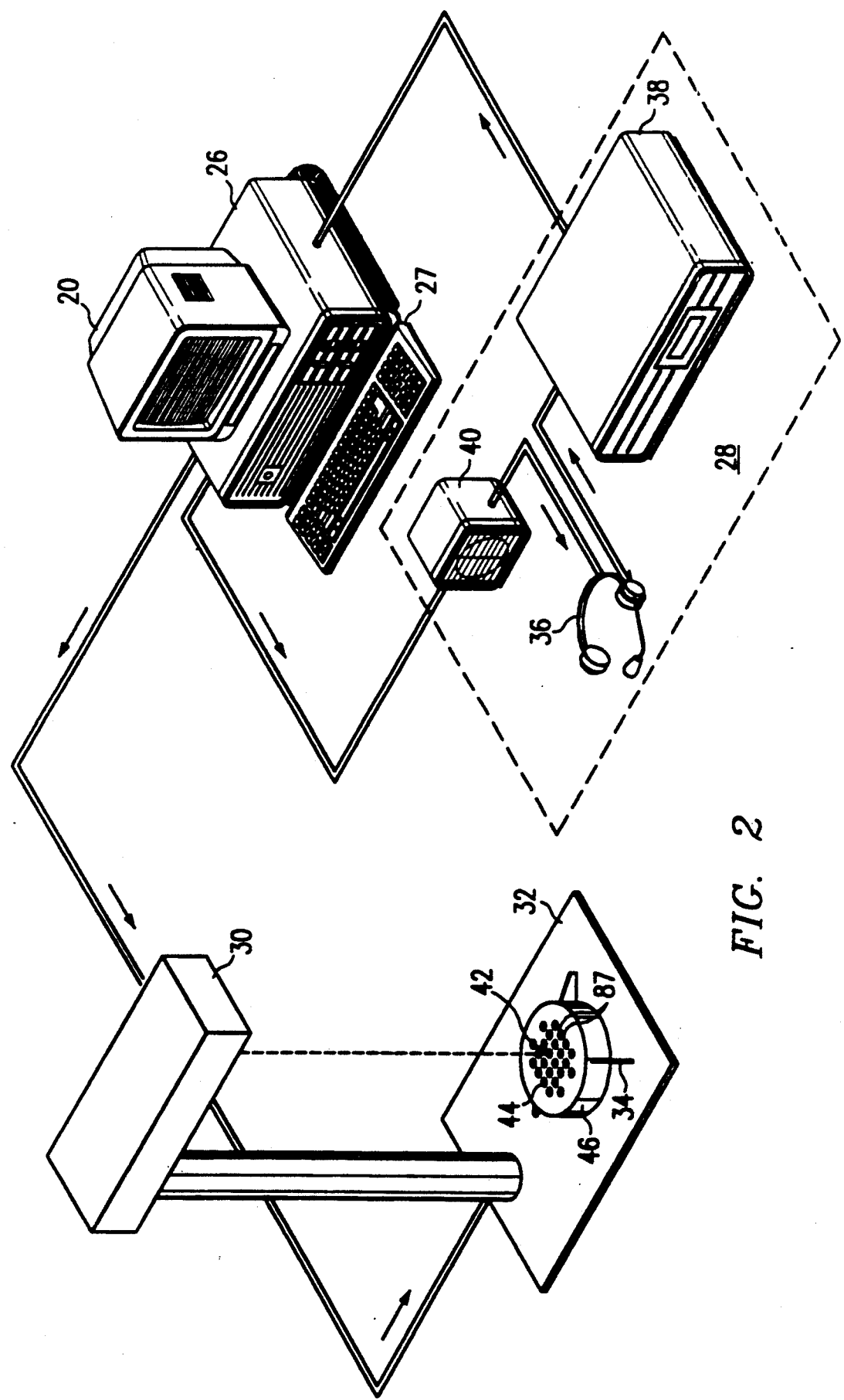
FIG. 2 is a simplified pictorial of one embodiment of the semi-automated system for the termination of harness conductors according to the present invention.

Referring to the drawing and FIG. 1 in particular, shown therein and generally designated by the reference character 10 is a semi-automated system for the termination of harness conductors that is constructed in accordance with the invention. Throughout the disclosure of this invention, the term "conductor" includes both an electrical conductor (such as wire) and an optical conductor (such as optical fiber). As illustrated, semi-automated system for termination of harness conductors 10 comprises a system controller 12 operatively connected to a data base 14. System controller 12 may be a general purpose main frame computer, a PC computer, a microprocessor with appropriate software and memory, etc. Data base 14 contains all harness and connector information pertaining to all the harnesses being fabricated and can and probably will be used by other phases of the harness fabrication prior to arriving at the termination phase performed by the present invention. Data input device 16 is operatively connected to system controller 12 to, as the name implies, provide input information to the system controller 12 regarding the particular connector and harness presently to be or is being terminated as well as confirming information as the termination process proceeds through various phases or steps. Data input device 16 may be a bar code reader 23, a voice recognition device 38, a keyboard 27, a touchscreen display 20, etc. The output of the system controller 12 is provided to numerous data output devices which may include a voice synthesizer 18, a touch screen display device 20, an optical or light indicator 22, a printer 24, etc. The operation of the system will be discussed below with reference to FIGS. 6-9.

FIG. 2 illustrates one embodiment of the present invention and comprises a personal computer 26, as the system controller, operatively connected to a voice data-link 28 and a light indicator device 30 which includes a fixture table 32 including a connector fixture 34 to hold a connector 46 used in the termination process. Personal computer 26 includes a display device 20 and a keyboard 27. The voice data-link 28 comprises a headset 36, a voice recognition device 38 operatively connected between the microphone of headset 36 and the personal computer 26 for use by the operator to verbally input information to the personal computer 26 and a voice synthesizer device 40 operatively connected between the earpiece or earphone of headset 36 and the personal computer 26 for use by the operator to verbally receive information and direction from the personal computer 26. Positioning control signals are sent to the light indicator device 30 from the personal computer 26 to move the spot of light 42 to various cavities 44 in connector 46. It will be appreciated that information for at least the particular harness being terminated, has been downloaded from data base 14 to the memory device in personal computer 26.

Figure 3:
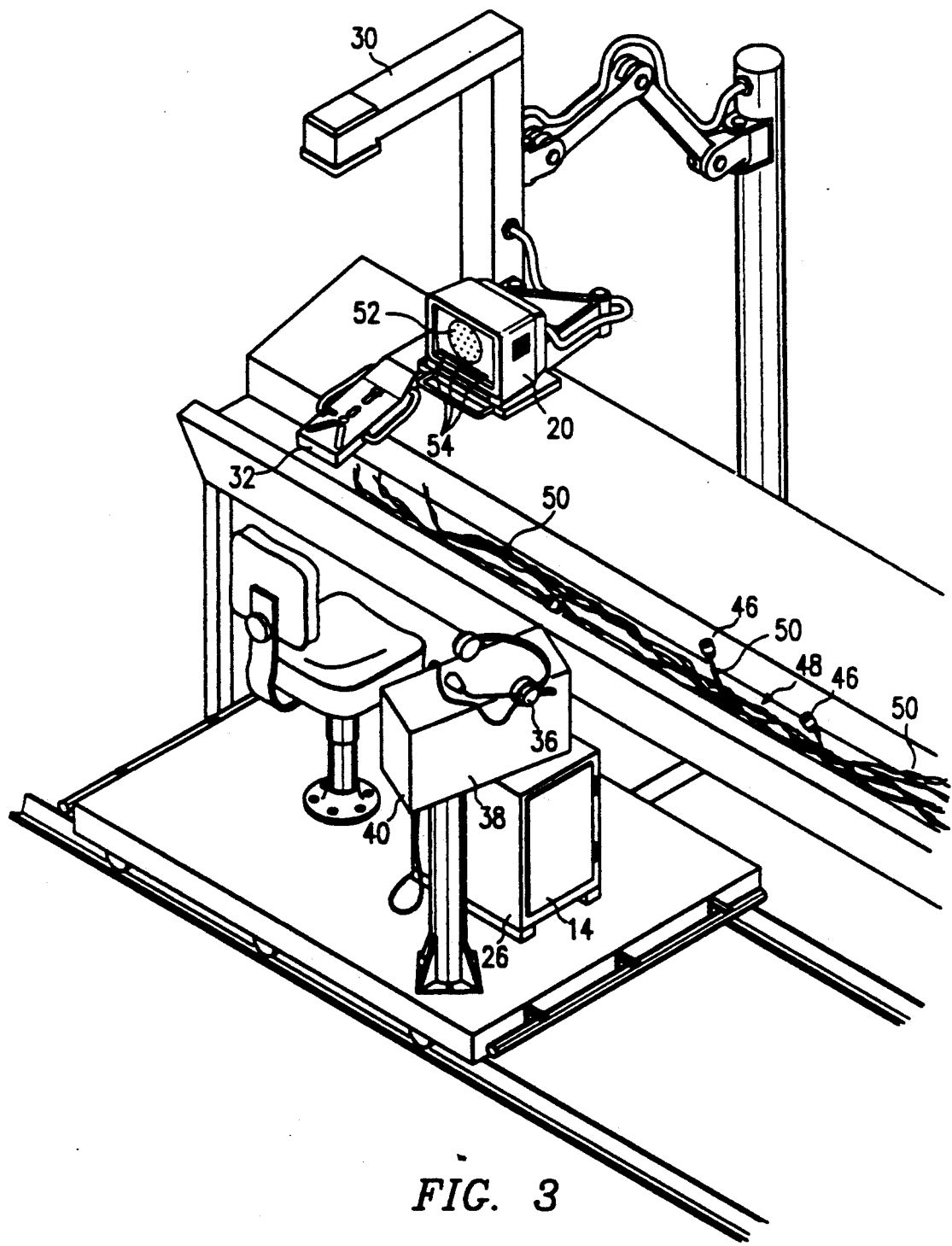
FIG. 3 is a perspective view of the semi-automated system for the termination of harness conductors according to the present invention.

FIG. 3 illustrates one implementation of one embodiment of the semi-automated system for termination of harness conductors showing a harness 48 with connectors 46 attached to conductors 50 of some bundles and other conductors 50 ready to be terminated with a connector 46. An animated graphic display 52 of connector 46 showing the cavities 44 therein is displayed on the display device 20. It will be appreciated that when the bar code reader 23 is to be used to input data to the computer 26, bar codes will be affixed to each harness 48 and/or each conductor 50 and/or each connector 46. Display device 20 includes touch-screen input capability with input commands 54 positioned along the lower portion of the screen of the display device 20. In this particular implementation, the voice recognition device 38 and the voice synthesizer device 40 are mounted in the same housing while the data base 14 and the personal computer 26 are mounted in the same housing.

The four primary phases of the process of termination of conductors in a harness into a connector are shown in FIG. 4 and begin with the log-on phase (log-on 56) in which the operator logs-on to the system and the process of termination is initiated. The next phase is the connector alignment phase (connector alignment 58) in which the connector 46 is aligned in the connector fixture 34 with respect to an indexing point provided by the light indicator device 30 in preparation for the insertion of moisture plugs and conductors. In the next phase, the moisture plugs are inserted (moisture insertion 60) in those cavities in the connector in which conductors are not going to be inserted. The last phase details the insertion of each randomly selected conductor (conductor termination 62) into a respective cavity of the connector.

Details of the four primary phases will be set forth in conjunction with FIGS. 2, 3 and 5-8. It will be appreciated that some of the steps set forth in FIGS. 5-8 could be skipped or left out without deviating from the concept of the invention.

FIG. 5 discloses the log-on phase in which the system and process are initiated. The operator will log into the system (log-in 64) by verbally inputting a password through the headset 36 and voice recognition device 38 or input a password through the keyboard 27 or touch screen display. A possible password would be operator's clock number. The computer 26 will download information (download 66) from the data base and will then verify that the operator is a valid user (recognition 68). If the operator is a valid user, the operator will then be required to perform a microphone check in response to prompts or instructions from the computer 26 via the voice synthesizer device 40, the headset 36 and/or the display device 20. The computer 26 will prompt the operator for harness identification information (prompt for harness information 70) via the voice synthesizer device 40 and/or the display device 20. The operator responds by inputting harness identification information (harness No. 72) via the headset 36 and the voice recognition device 38 or the keyboard 27, touch screen display 20 or bar code reader 23. An alternative input from the operator would be the AIL or traveler number (input AIL 74).

FIG. 6 discloses the connector alignment phase of the conductor termination process. The computer 26 will prompt the operator (prompt for end reference 76) for end reference designator or code information via the voice synthesizer device 40, headset 36 and/or the display device 20. The operator will input the end reference designator or code (end reference designator 78) for the conductors to be terminated via the headset 36 and voice recognition device 38 or the keyboard 27, touch screen display 20 or bar code reader 23. The computer 26 will then provide to the operator, via the voice synthesizer device 40, the connector identification code, the fixture table code and the backshell code (connector and backshell code 80) and will also display this same information on the display device 20. The computer 26 will then prompt the operator, via the voice synthesizer device 40 or display device 20, for confirmation of connector and backshell installation (prompt for confirmation 82) in the connector fixture 34. The operator will load the correct connector and backshell into the connector fixture 34 and confirm the installation via the voice recognition device 38 or the keyboard 27 or the display device 20 and request an alignment (request for alignment 84) of the connector 46. The computer 26 will then provide control signals to the light indicator device 30 which will cause the light indicator device 30 to provide a spot of light on the connector 46 to be used by the operator as an indexing point on the connector 46 for visual alignment of the connector 46 by the operator. The computer 26 will send signals to the display device 20 resulting in a graphic display of the connector 46 on the display device 20 with the cavities 44 shown therein. The display device 20 will be animated by using a combination of graphics and color to indicate connector cavities and status. An example of one possible arrangement is that on the display device 20, during the termination process, each open cavity will contain an "O", each filled cavity will contain an "X" and the cavity which is to be filled at the present time will be flashing. The computer 26 will send a signal to the display device causing the display device 20 to indicate on the screen which cavity 44 in the connector 46 is to be used for alignment purposes. The operator will align the connector in the connector fixture. The computer will prompt the operator, via the voice synthesizer device 40 or display device 20, for confirmation that the connector has been aligned (prompt for alignment 86). The operator will verbally input confirmation, via the voice recognition device 38 or manually via the keyboard 27 or display device 20, that the alignment of the connector 46 has been completed.

FIG. 7 discloses the moisture plug insertion phase of the conductor termination process. Computer 26 will access the data base 14 and obtain information (spare contact and moisture plug codes 88) necessary to indicate to the operator those cavities 44 which require moisture plugs 87 (see FIG. 2) to be inserted therein. The computer 26 will prompt the operator (system prompt 90) via the voice synthesizer device 40 or display device 20 to determine if the operator is ready for the moisture plug insertion phase. The operator will verbally input confirmation via the voice recognition device 38 or keyboard that the operator is ready. The computer 26 will supply commands to the light indicator device 30 causing the light indicator device 30 to locate a spot of light on the cavity (laser sequence insertion 92) to be filled with a moisture plug. The pin cavity 44 to be filled by a moisture plug 87 will also be indicated on the screen of the display device 20. The operator will insert the moisture plug and confirm verbally (operator insertion confirmation 94) to the computer 26 via the voice recognition device 38. This sequence will be repeated until all the cavities 44 which are to receive moisture plugs 87 have been filled with spare contacts and moisture plugs 87 (complete moisture plug insertion 96). It will be appreciated that if the connector 46 does not require any moisture plugs, this phase will be skipped.

FIG. 8 discloses the conductor termination phase of the conductor termination process. Computer 26 prompts the operator (prompt for conductor code 98) via the voice synthesizer device 40 or the display device 20 for a conductor identification code. The operator will randomly select a conductor from the bundle for that particular connector and input (conductor code input 100) a conductor code to the computer 26 via the voice recognition device 38 or the keyboard 27 or bar code reader 23. The computer 26 will validate the conductor identification (system analysis 102) as being correct for that connector and if it is correct the computer 26 will command the light indicator device 30 to illuminate the designated cavity for that conductor and command the display device 20 to indicate on the screen, the cavity to be filled by the conductor. The operator will insert the conductor into the illuminated cavity and verbally confirm to the computer 26 (operator confirmation 104) that the conductor insertion for that cavity has been completed. The computer 26 will then prompt the operator for another conductor identification code and the process will be repeated until all the conductors have been inserted (completed conductor insertion 106).

The computer 26 will then prompt the operator via the voice synthesizer device 40 or the display device 20 for a new reference designator for a new and different conductor bundle (prompt for new end designator 108). The operator will provide such a designator or will exit the program and the conductor termination.

This inventive system of conductor termination will reduce operator time in searching for a conductor and pin location on a paper data sheet and will increase quality control by the use of a computer. If a conductor code is read to the computer that does not belong to the connector that is being terminated, the computer will indicate this to the operator. When a conductor is inserted into the wrong cavity this will be brought to the attention of the operator when the operator tries to insert another conductor into the same cavity and can visually see that the location is filled. The computer will also print out a DING sheet giving quality control a method of monitoring the termination of a connector.

Although the present invention has been described with reference to a presently preferred embodiment, it will be appreciated by those skilled in the art that various modifications, alternatives, variations, etc., may be made without departing from the spirit and scope of the invention as defined in the appended claims.

We claim:

1. A method of randomly installing predetermined components into designated locations in an assembly unit using a semi-automated component installation system which includes at least system controller means operatively connected to data input means, data output means and a light indicator means, said method comprising the steps of:

(a) receiving request for assembly unit code at the data output means from the system controller means;

(b) providing assembly unit code to the system controller means from the data input means;

(c) receiving confirmation of the assembly code at the data output means from the system controller means;

(d) loading assembly unit into a holding fixture;

(e) providing request for alignment of assembly unit to the system controller means from the data input means;
(f) receiving spot of light from light indicator means on the assembly unit to indicate the location of an indexing point for the assembly unit;
(g) moving assembly unit to position the predetermined indexing point on the assembly unit in alignment with the spot of light;
(h) providing information to the system controller means through the data input means confirming alignment of assembly unit completed;
(i) receiving request for a component identification code at the data output means from the system controller means;
(j) providing component identification code of a randomly selected component to the system controller means through the data input means;
(k) receiving confirmation of the component identification code at the data output means from the system controller means;
(l) receiving spot of light from the light indicator means on a designated location for said randomly selected component;
(m) installing said randomly selected component into said designated location;
(n) providing information to the system controller means through the data input means confirming that said randomly selected component has been installed; and
(o) repeating steps (i), (j), (k), (l), (m) and (n) until all predetermined components have been installed.

2. The method of claim 1 wherein said data input means includes a voice recognition device and said data output means includes a voice synthesizer device.

3. The method of claim 1 wherein said data input means includes a keyboard.

4. The method of claim 1 wherein said data input means includes a bar code reader.

5. The method of claim 1 wherein said data input means includes a touch screen display device.

6. The method of claim 1 wherein said data output means includes a display device.

7. The method of claim 1 wherein said system controller means includes a computer and data base.

8. A method of randomly installing predetermined components into designated locations in an assembly unit using a semi-automated component installation system which includes at least computer means operatively connected to voice recognition means, voice synthesizer means and a light indicator means, said method comprising the steps of:
(a) verbally receiving request for assembly unit code through the voice synthesizer means;
(b) verbally providing an assembly unit code to the voice recognition means;
(c) verbally receiving confirmation of assembly unit code through voice synthesizer means;
(d) loading assembly unit into a holding fixture;
(e) verbally providing request for alignment of assembly unit to the voice recognition means;
(f) receiving spot of light from light indicator means on the assembly unit to indicate the location of an indexing point for the assembly unit;
(g) moving assembly unit to position the predetermined indexing point on the assembly unit in alignment with the spot of light;
(h) verbally providing information to the voice recognition means confirming alignment of assembly unit completed;
(i) verbally receiving request for a component identification code through the voice synthesizer means;
(j) verbally providing component identification code of a randomly selected component to the voice recognition means;
(k) verbally receiving confirmation of the component identification code through the voice synthesizer means;
(l) receiving spot of light from light indicator means on a designated receptacle location for said randomly selected component;
(m) installing said randomly selected component into said designated location;
(n) verbally providing information to the voice recognition means confirming that said randomly selected component has been installed; and
(o) repeating steps (i), (j), (k), (l) (m), and (n) until all predetermined components have been installed.

9. A method of producing a harness by interconnection of conductors in a harness to designated cavities in a connector in a random manner using a semiautomatic system for termination of harness conductors which includes at least system controller means operatively connected to data input means, data output means and a light indicator means, said method comprising the steps of:
(a) receiving request for harness identification information at the data output means from the system controller means;
(b) providing harness identification information to the system controller means from the data input means;
(c) receiving confirmation of the harness identification information at the data output means from the system controller means;
(d) receiving request for end designation code at the data output means from the system controller means;
(e) providing end designation code to the system controller means from the data input means;
(f) receiving confirmation of the end designation code at the data output means from the system controller means;
(g) receiving connector identification code at the data output means from the system controller means for the connector to be loaded;
(h) loading connector into a connector fixture;
(i) providing request for alignment of connector to the system controller means from the data input means;
(j) receiving spot of light from light indicator means on the connector to indicate location of a predetermined indexing point for the connector;
(k) moving connector to position the predetermined indexing point on the connector in alignment with the spot of light;
(l) providing information to the system controller means through the data input means confirming alignment of connector completed;
(m) receiving spot of light from light indicator means on a predetermined cavity;
(n) inserting a moisture plug into said predetermined cavity;
(o) providing information to the system controller means confirming that moisture plug has been inserted;

(p) receiving spot of light from light indicator means on a different predetermined cavity;

(q) inserting a moisture plug into said different predetermined cavity; and (r) repeating steps (o), (p) and (q) until all moisture plugs have been inserted.

10. The method of claim 9 wherein the harness identification information includes the harness identification number, PMOD and effectivity.

11. The method of claim 9 wherein the predetermined indexing point on the connector comprises a cavity.

12. The method of claim 9 further comprising the following additional steps of:

(s) receiving request for a conductor identification code at the data output means from the system controller means;

(t) providing a conductor identification code of a randomly selected conductor to the system controller means from the data input means;

(u) receiving confirmation of the conductor identification code at the data output means from the system controller means;

(v) receiving spot of light from light indicator means on the cavity to receive the randomly selected conductor identified by the conductor identification code;

(w) inserting the randomly selected conductor identified by the conductor identification code into the cavity receiving the spot of light from the light indicator means;

(x) providing information to the system controller means through the data input means confirming insertion of the randomly selected conductor identified by the conductor identification code into the cavity receiving the spot of light; and (y) repeating steps (s), (t), (u), (v), (w) and (x) until all the conductors have been inserted into their respective cavities.

13. The method of claim 12 wherein said conductor comprises an electrically conductive wire.

14. The method of claim 12 wherein said conductor comprises an optical fiber.

15. The method of claim 9 wherein said data input means includes a bar code reader.

16. The method of claim 9 wherein said data input means includes a touch screen display device.

17. The method of claim 9 wherein said data output means includes a display device.

18. The method of claim 9 wherein said system controller means includes a computer and data base.

19. The method of claim 9 wherein said data input means includes a voice recognition device and said data output means includes a voice synthesizer device.

20. The method of claim 9 wherein said data input means includes a keyboard.

21. A method of producing a harness by interconnection of conductors in a harness to designated cavities in a connector in a random manner using a semiautomatic system for termination of harness conductors which includes at least system controller means operatively connected to data input means, data output means and a light indicator means, said method comprising the steps of:

(a) receiving request for harness identification information at the data output means from the system controller means;

(b) providing harness identification information to the system controller means from the data input means;

(c) receiving confirmation of the harness identification information at the data output means from the system controller means;

(d) receiving request for end designation code at the data output means from the system controller means;

(e) providing end designation code to the system controller means from the data input means;

(f) receiving confirmation of the end designation code at the data output means from the system controller means;

(g) receiving connector identification code at the data output means from the system controller means for the connector to be loaded;

(h) loading connector into a connector fixture;

(i) providing request for alignment of connector to the system controller means from the data input means;

(j) receiving spot of light from light indicator means on the connector to indicate location of a predetermined indexing point for the connector;

(k) moving connector to position the predetermined indexing point on the connector in alignment with the spot of light;

(l) providing information to the system controller means through the data input means confirming alignment of connector completed;

(m) receiving request for a conductor identification code at the data output means from the system controller means;

(n) providing a conductor identification code of a randomly selected conductor to the system controller means from the data input means;

(o) receiving confirmation of the conductor identification code at the data output means from the system controller means;

(p) receiving spot of light from light indicator means on the cavity to receive the randomly selected conductor identified by the conductor identification code;

(q) inserting the randomly selected conductor identified by the conductor identification code into the cavity receiving the spot of light from the light indicator means;

(r) providing information to the system controller means through the data input means confirming insertion of the randomly selected conductor identified by the conductor identification code into the cavity receiving the spot of light; and (s) repeating steps (m), (n), (o), (p), (q) and (r) until all the conductors have been inserted into their respective cavities.

22. The method of claim 21 wherein said data input means includes a voice recognition device and said data output means includes a voice synthesizer device.

23. The method of claim 21 wherein said data input means includes a keyboard.

24. The method of claim 21 wherein said data input means includes a bar code reader.

25. The method of claim 21 wherein said data input means includes a touch screen display device.

26. The method of claim 21 wherein said data output means includes a display device.

27. The method of claim 21 wherein said system controller means includes a computer and data base.

28. The method of claim 21 wherein said conductor comprises an electrically conductive wire.

29. The method of claim 21 wherein said conductor comprises an optical fiber.

30. A method of producing a harness by interconnection of conductors in a harness to corresponding cavities in a connector in a random manner using a semi-automated system for termination of harness conductors which includes at least computer means and data base, voice recognition means, voice synthesizer means and a light indicator means, said method comprising the steps of:
- (a) verbally providing harness identification information to the voice recognition means;
- (b) verbally receiving confirmation of the harness identification information through the voice synthesizer means;
- (c) verbally receiving request for end designation code through the voice synthesizer means;
- (d) verbally providing an end designation code to the voice recognition means;
- (e) verbally receiving confirmation of end designation code through voice synthesizer means;
- (f) verbally receiving connector identification code through the voice synthesizer means for the connector to be loaded;
- (g) loading connector into a connector fixture;
- (h) verbally providing request for alignment of connector to the voice recognition means;
- (i) receiving spot of light from light indicator mean on the connector to indicate the location of an indexing point for the connector;
- (j) moving connector to position the predetermined indexing point on the connector in alignment with the spot of light;
- (k) verbally providing information to the voice recognition means confirming alignment of connector completed;
- (l) receiving spot of light from light indicator means on a predetermined cavity;
- (m) inserting a moisture plug into said designated predetermined cavity; recognition means confirming that moisture plug has been inserted;
- (o) receiving spot of light from light indicator means on a different predetermined cavity;
- (p) inserting a moisture plug into said different predetermined cavity; and
- (q) repeating steps (n), (o) and (p) until all moisture plugs have been inserted.

31. The method of claim 30 wherein the harness identification information includes the harness identification number, PMOD and effectivity.

32. The method of claim 30 wherein the predetermined indexing point on the connector comprises a cavity.

33. The method of claim 30 further comprising the following additional steps:
- (r) verbally receiving request for a conductor identification code through the voice synthesizer means;
- (s) verbally providing a conductor identification cod of a randomly selected conductor to the voice recognition means;
- (t) verbally receiving confirmation of the conductor identification code through the voice synthesizer means;
- (u) receiving spot of light from light indicator means on the cavity to receive the randomly selected conductor identified by the conductor identification code;
- (v) inserting the randomly selected conductor identified by the conductor identification code into the cavity receiving the spot of light from the light indicator means;
- (w) verbally providing information to the voice recognition means confirming insertion of the randomly selected conductor identified by the conductor identification code into the cavity receiving the spot of light; and
- (x) repeating steps (r), (s), (t), (u), (v) and (w) until all conductors have been inserted into their respective cavities.

34. The method of claim 33 wherein said conductor comprises an electrically conductive wire.

35. The method of claim 33 wherein said conductor comprises an optical fiber.

36. A semi-automated component installation system for randomly installing predetermined components into designated locations in an assembly unit, said semi-automated component installation system comprising:
fixture means to hold the assembly unit;
light means for projecting a spot of light on selected locations in said assembly unit;
said fixture means and light means being stationary and said light means being distant from said assembly unit;
computer means operatively connected to said light means to provide signals to control the position of said spot of light, said computer means operatively connected to data base means including all component and locations information pertaining to the assembly unit having components installed therein;
voice data-link means operatively connected to said computer means for transfer of verbal information between the semi-automated component installation system and an operator regarding the assembly unit.

37. The system of claim 36 wherein said voice data-link comprises a voice synthesizer device, a voice recognition device and a headset.

38. The system of claim 36 further including data input means operatively connected to said computer means to transfer data to said computer means, said data input means includes bar code reader means.

39. The system of claim 38 wherein said data input means further includes keyboard means.

40. The system of claim 38 wherein said data input means further includes a touch screen display device.

41. The system of claim 36 further including a display means operatively connected to said computer means for displaying at least predetermined portions of the information which is verbally transmitted to the operator via the voice data-link means.

42. The system of claim 41 wherein said display means comprises a video display.

43. The system of claim 42 wherein said video display will show an animated graphic display of the assembly unit showing which receptacles are open, which receptacles are filled and which receptacle is currently to be filled.

44. The system of claim 36 wherein said light means comprises a laser device which radiates visible light.

45. A semi-automated system for terminating predetermined conductors in a harness into designated cavities in a connector in a random manner, said semi-automated system comprising:
fixture means to hold the connector;

light means for projecting a spot of light on selected cavities in said connector at selected times;

said fixture means and light being stationary and said light means being distant from said assembly unit;

computer means operatively connected to said light means to provide signals to control the position of said spot of light, said computer means operatively connected to data base means including all harness and connector information pertaining to the particular harness being terminated; and voice data-link means operatively connected to said computer means for transfer of verbal information between the semi-automated termination system and an operator regarding the harness.

46. The system of claim 45 wherein said voice data-link comprises a voice synthesizer device, a voice recognition device and a headset.

47. The system of claim 45 further including data input means operatively connected to said computer means to transfer data to said computer means, said data input means includes bar code reader means.

48. The system of claim 47 wherein said data input means further includes keyboard means.

49. The system of claim 47 wherein said data input means further includes a touch screen display device.

50. The system of claim 45 further including a display means operatively connected to said computer means for displaying at least predetermined portions of the information which is verbally transmitted to the operator via the voice data-link means.

51. The system of claim 50 wherein said display means comprises a video display.

52. The system of claim 51 wherein said video display will show an animated graphic display of the connector showing which cavities are open, which cavities are filled and which cavity is currently to be filled.

53. The system of claim 45 wherein said light means comprises a laser device which radiates visible light.

* * * * *